United States Patent
Sun

(10) Patent No.: US 11,320,346 B2
(45) Date of Patent: May 3, 2022

(54) AUTOSAMPLER

(71) Applicant: SHIMADZU CORPORATION, Kyoto (JP)

(72) Inventor: Shengsheng Sun, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 189 days.

(21) Appl. No.: 16/868,815

(22) Filed: May 7, 2020

(65) Prior Publication Data
US 2020/0393335 A1    Dec. 17, 2020

(30) Foreign Application Priority Data
Jun. 13, 2019    (CN) .......................... 201920886120.4

(51) Int. Cl.
*G01N 1/14* (2006.01)
*G01N 21/31* (2006.01)
*G01N 35/04* (2006.01)

(52) U.S. Cl.
CPC ............ *G01N 1/14* (2013.01); *G01N 21/3103* (2013.01); *G01N 2035/0474* (2013.01); *G01N 2035/0484* (2013.01)

(58) Field of Classification Search
CPC ................ G01N 2035/0474; G01N 2035/0484
USPC ................................................ 73/864, 864.01
See application file for complete search history.

(56) References Cited

U.S. PATENT DOCUMENTS 4,869,114 A * 9/1989 Kido ...................... G01N 35/10
                                                              73/864.24
4,927,603 A * 5/1990 Fischer .............. G01N 35/1095
                                                              422/549

(Continued)

FOREIGN PATENT DOCUMENTS

DE         3821604 A1 *  1/1989    ......... G01N 35/1095
EP         0563893 A2 * 10/1993    ........... G01N 35/109
JP        H0996642 A  *  8/1997

*Primary Examiner* — David A. Rogers
(74) *Attorney, Agent, or Firm* — Sughrue Mion, PLLC

(57) ABSTRACT

The present invention relates to an autosampler. The autosampler includes a sampling needle, a swing arm, a main shaft, a synchronous rotating pulley, and a rotating shaft sleeve. One end of the swing arm is fixed to the main shaft, and the other end thereof is fixed with the sampling needle for supplying a sample. The rotating shaft sleeve is installed in the synchronous rotating pulley, and the rotating shaft sleeve is mounted on the main shaft. The main shaft can rotate around the central axis of the main shaft in synchronization with the rotating shaft sleeve, and can move up and down in the direction of the central axis with respect to the rotating shaft sleeve. The autosampler is characterized in that it further includes a contact member. The contact member penetrates the synchronous rotating pulley and the rotating shaft sleeve from one side of the synchronous rotating pulley in the radial direction thereof until it comes into contact with the main shaft. The contact member is in rolling contact with the main shaft. According to the present invention, the contact member may provide a radial force to the main shaft so as to eliminate a fitting gap between the main shaft and the rotating shaft sleeve, and may reliably fix the synchronous rotating pulley and the rotating shaft sleeve so as to ensure the accuracy and reproducibility of the injection position.

4 Claims, 2 Drawing Sheets

(56) References Cited

U.S. PATENT DOCUMENTS

| | | | | |
|---|---|---|---|---|
| 4,951,512 | A * | 8/1990 | Mazza | G01N 35/1079 |
| | | | | 141/130 |
| 5,756,905 | A * | 5/1998 | Ueda | G01N 30/18 |
| | | | | 73/864.24 |
| 5,879,627 | A * | 3/1999 | Tanihata | G01N 35/1079 |
| | | | | 422/67 |
| 6,159,185 | A * | 12/2000 | Tanihata | G01N 30/18 |
| | | | | 600/576 |
| 6,558,041 | B2 * | 5/2003 | Laos | F16F 15/04 |
| | | | | 277/355 |
| 6,634,349 | B2 * | 10/2003 | Mizek | F41B 5/143 |
| | | | | 124/44.5 |
| 6,843,357 | B2 * | 1/2005 | Bybee | B25J 18/04 |
| | | | | 198/345.3 |
| 6,866,820 | B1 * | 3/2005 | Otto | B65D 47/00 |
| | | | | 215/235 |
| 7,377,189 | B2 * | 5/2008 | Champseix | G01N 35/1079 |
| | | | | 73/864.25 |
| 8,071,053 | B2 * | 12/2011 | Matsuzaki | G01N 35/10 |
| | | | | 422/509 |
| 9,651,086 | B2 * | 5/2017 | Rimpel | F16C 17/024 |
| 9,829,498 | B2 * | 11/2017 | Onoki | G01N 35/1004 |
| 10,613,108 | B2 * | 4/2020 | Mori | G01N 35/0099 |
| 2004/0094385 | A1 * | 5/2004 | Bybee | B65G 21/22 |
| | | | | 198/339.1 |
| 2009/0038415 | A1 * | 2/2009 | Matsuzaki | G01N 35/10 |
| | | | | 73/864.21 |
| 2017/0108525 | A1 * | 4/2017 | Liu | G01N 35/1065 |
| 2018/0267068 | A1 * | 9/2018 | Mori | G01N 35/0099 |

* cited by examiner

AUTOSAMPLER

BACKGROUND OF THE INVENTION

Field of the Invention

The present invention relates to an autosampler.

Description of the Background Art

The accuracy and reproducibility of an injection position of a sample solution are very important in the analysis and measurement of an instrument such as an atomic absorption spectrophotometer, which directly influences the accuracy and reproducibility of the final measurement result. An autosampler to be used in combination with such instrument plays the role as described above.

In an autosampler, after a sampling needle sucks a sample, the sampling needle is required to be accurately inserted into an injection hole of a heating tube or the like to inject the sample. Since the diameter of the injection hole is as small as about 2 mm, if the reproducibility of the injection position of the sampling needle is poor, the sampling needle and the heating tube may be worn away, which directly affects the service life of the sampling needle and the heating tube and affects the accuracy and reproducibility of the final measurement result.

In a conventional autosampler, a rotating motor rotates a synchronous rotating pulley, and a rotating shaft sleeve provided in the synchronous rotating pulley rotates a main shaft, and thereby, a swing arm is rotated. Since the fitting between the main shaft and the rotating shaft sleeve is dynamic fitting, a fitting gap is present. Therefore, the sampling needle fixed at one end of the swing arm may jitter within a certain distance, which causes the sampling needle to be located at different positions even by the same operation command, making it impossible to accurately position the sampling needle so as to inject the sample, deteriorating the reproducibility.

Further, in the conventional autosampler, the rotating shaft sleeve is fixed in the synchronous rotating pulley only by interference fit. The interference fit may become loose due to the abrasion or exhaustion of the synchronous rotating pulley and the rotating shaft sleeve. When the interference fit between the synchronous rotating pulley and the rotating shaft sleeve is loosened, the sampling needle may be located at different positions even by the same operation command.

SUMMARY OF THE INVENTION

The present invention has been accomplished in view of the aforementioned problems, and it is therefore an object of the present invention to solve the poor accuracy and reproducibility of the injection position of an autosampler. The present invention provides an autosampler that can ensure high accuracy and reproducibility of the injection position.

In order to attain the object mention above, the present invention provides an autosampler which includes a sampling needle, a swing arm, a main shaft, a synchronous rotating pulley, and a rotating shaft sleeve. One end of the swing arm is fixed to the main shaft, and the other end thereof is fixed with the sampling needle for supplying a sample. The rotating shaft sleeve is installed in the synchronous rotating pulley, and the rotating shaft sleeve is mounted on the main shaft. The main shaft is rotatable around a central axis of the main shaft in synchronization with the rotating shaft sleeve, and movable up and down in the direction of the central axis with respect to the rotating shaft sleeve. The autosampler is characterized in that it further includes a contact member. The contact member penetrates the synchronous rotating pulley and the rotating shaft sleeve from one side of the synchronous rotating pulley in the radial direction thereof until it comes into contact with the main shaft, and the contact member is in rolling contact with the main shaft.

According to the technical solution mentioned above, since the contact member is in contact with the main shaft, the contact member applies a radial force to the main shaft, which thereby eliminates a fitting gap between the main shaft and the rotating shaft sleeve. Further, since the contact member penetrates the synchronous rotating pulley and the rotating shaft sleeve from one side of the synchronous rotating pulley in the radial direction thereof until it comes into contact with the main shaft, the rotating shaft sleeve may be reliably fixed to the synchronous rotating pulley by the contact member even though the synchronous rotating pulley and the rotating shaft sleeve undergo abrasion or exhaustion. Therefore, the sampling needle fixed at one end of the swing arm does not jitter when being rotated. Accordingly, the sampling needle is located at the same position by the same operation command, which ensures the accuracy and reproducibility of the injection position, making it possible to improve the accuracy and reproducibility of analysis by an instrument such as an atomic absorption spectrophotometer equipped with the autosampler. In addition, since the contact member is in rolling contact with the main shaft, the fitting gap between the main shaft and the rotating shaft sleeve may be eliminated without affecting the up and down motion of the main shaft.

According to one embodiment of the present invention, the present invention provides an autosampler, wherein the contact member includes: a rolling member that comes into rolling contact with the main shaft; a fixing member which has one end provided with a mounting hole and the other end fixed to the synchronous rotating pulley, and the rolling member being held at the top of the mounting hole; and an elastic member which is installed inside the mounting hole in such a manner that one end is connected to the rolling member and the other end is fixed to the bottom of the mounting hole so as to bias the rolling member toward the main shaft in the radial direction of the main shaft.

According to the technical solution mentioned above, since the elastic member may be adjusted so as to adjust the force applied to the main shaft, the radial force applied to the main shaft may be adjusted according to different requirements, which ensures the accuracy and reproducibility of the injection position, making it possible to improve the accuracy and reproducibility of analysis by an instrument such as an atomic absorption spectrophotometer equipped with the autosampler.

According to one embodiment of the present invention, the present invention provides an autosampler, wherein the contact member is fixed to the synchronous rotating pulley by screwing.

According to the technical solution mentioned above, the contact member may be reliably fixed to the synchronous rotating pulley, which ensures the accuracy and reproducibility of the injection position, making it possible to improve the accuracy and reproducibility of analysis by an instrument such as an atomic absorption spectrophotometer equipped with the autosampler.

According to one embodiment of the present invention, the present invention provides an autosampler, wherein the peripheral surface of the main shaft includes two flat surfaces facing each other, and the contact member is in contact with one of the two flat surfaces of the main shaft.

According to the technical solution mentioned above, the contact member may be brought into reliable contact with the main shaft so as to reliably eliminate the fitting gap between the main shaft and the rotating shaft sleeve, which ensures the accuracy and reproducibility of the injection position, making it possible to improve the accuracy and reproducibility of analysis by an instrument such as an atomic absorption spectrophotometer equipped with the autosampler.

DESCRIPTION OF THE PREFERRED EMBODIMENTS

Figure 1:
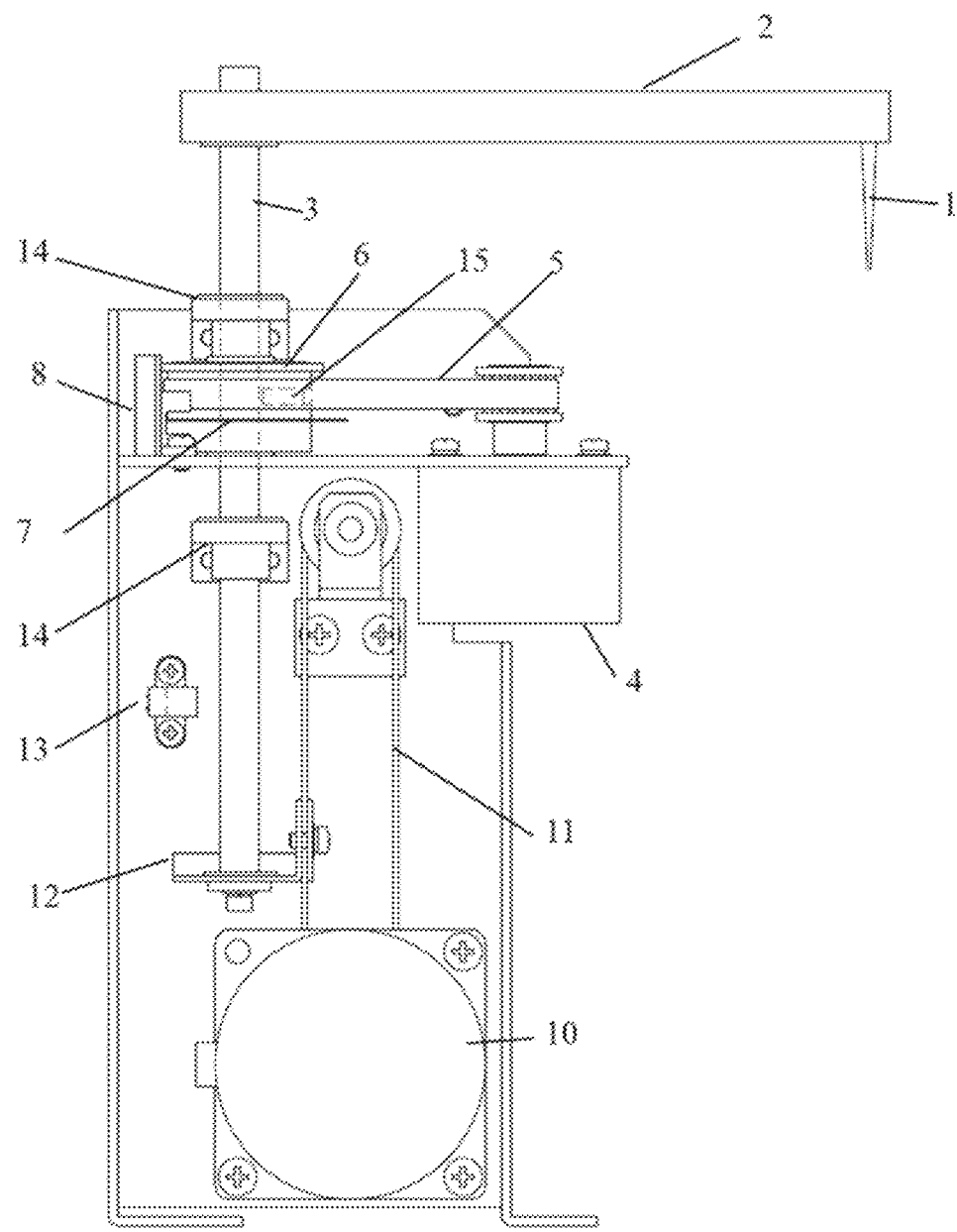
FIG. 1 is a schematic view illustrating main components of an autosampler according to the present invention.

Hereinafter, the present invention will be described with specific embodiments, and a person skilled in the art may easily understand other advantages and effects of the present invention from the contents disclosed in the present specification. Although the present invention is described with reference to the specific embodiments, the present invention is not limited to the specific embodiments. The purpose of the present specification is to describe the present invention with reference to the specific embodiments so as to include any possible modifications or improvements made on the basis of the claims of the present invention. In order to provide a thorough understanding of the present invention, the following description may include various details. It should be noted that the present invention may be realized without those details. In addition, certain details may be omitted in the specification so as not to vague or obscure the gist of the present invention. The embodiments of the present invention and the features described in the embodiments may be combined with each other as long as no inconsistency is found.

In the present specification, the same components will be denoted by the same reference numerals in the following drawings, and if a certain component is defined in one drawing, it will not be repeatedly defined or described in the other drawings.

In order to make clear the objects, the technical solutions and the advantages of the present invention, the embodiments of the present invention will be described in detail with reference to the drawings.

Figure 2:
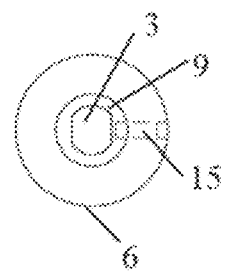
FIG. 2 is a top view illustrating a synchronous rotating pulley when the synchronous rotating pulley is viewed in the direction of a main shaft of the autosampler according to the present invention.

FIG. 1 is a schematic view illustrating main components of an autosampler according to the present invention. FIG. 2 is a top view illustrating a synchronous rotating pulley when the synchronous rotating pulley is viewed in the direction of a main shaft of the autosampler according to the present invention. As illustrated in FIGS. 1 and 2, the autosampler according to the present invention includes a sampling needle 1, a swing arm 2, a main shaft 3, a rotating motor 4, a rotating belt 5, a synchronous rotating pulley 6, a rotating position locating plate 7, a rotating position locating sensor 8, a rotating shaft sleeve 9, a lifting motor 10, a lifting belt 11, a lifting position locating plate 12, a lifting position locating sensor 13, a position-locating shaft sleeve 14, a contact member 15, and the like. The sampling needle 1 is fixed at one end of the swing arm 2 and is used to supply a sample. The other end of the swing arm 2 is fixed to the main shaft 3 and moves in synchronization with the main shaft 3. The rotating shaft sleeve 9 is provided in the synchronous rotating pulley 6, and the rotating shaft sleeve 9 is mounted on the main shaft 3. The rotating motor 4 rotates the synchronous rotating pulley 6 via the rotating belt 5, and accordingly, the rotating shaft sleeve 9 provided in the synchronous rotating pulley 6 rotates the main shaft 3 around the central axis of the main shaft 3. The rotating angle of the main shaft 3 is determined by the rotating position locating sensor 8 and the rotating position locating plate 7. The lifting motor 10 moves the main shaft 3 up and down in the direction of the central axis of the main shaft 3 by using the lifting belt 11 and the lifting position locating plate 12. The movable range of the main shaft 3 is limited by the two position-locating shaft sleeves 14, and the lifting position of the main shaft 3 is determined by the lifting position locating plate 12 and the lifting position locating sensor 13. Thereby, the main shaft 3 may be rotated and moved up and down so as to move the sampling needle 1 to a predetermined position to perform operations such as suction, injection, and cleaning.

The autosampler further includes a contact member 15. As illustrated in FIG. 2, the contact member 15 penetrates the synchronous rotating pulley 6 and the rotating shaft sleeve 9 from one side of the synchronous rotating pulley 6 in the radial direction thereof until it comes into contact with the main shaft 3. The contact member 15 is in rolling contact with the main shaft 3.

Thus, the contact member 15 may apply a radial force to the main shaft 3 so as to eliminate a fitting gap between the main shaft 3 and the rotating shaft sleeve 9, and thus, the synchronous rotating pulley 6 and the rotating shaft sleeve 9 may be reliably fixed together by the contact member 15. Therefore, the sampling needle fixed at one end of the swing arm does not jitter when being rotated. Accordingly, the sampling needle is located at the same position by the same operation command, which ensures the accuracy and reproducibility of the injection position, making it possible to improve the accuracy and reproducibility of analysis by an instrument such as an atomic absorption spectrophotometer equipped with the autosampler.

Further, since the contact member 15 is in rolling contact with the main shaft 3, even if the contact member 15 applies a radial force to the main shaft 3 when the main shaft 3 is being moved up and down, the radial force will not affect the up and down motion of the main shaft 3. Therefore, the fitting gap between the main shaft 3 and the rotating shaft sleeve 9 may be eliminated without affecting the up and down motion of the main shaft 3.

As illustrated in FIG. 2, the peripheral surface of the main shaft 3 is composed of two flat surfaces facing each other and two arc surfaces facing each other. The contact member 15 is in contact with one of the two flat surfaces of the main shaft 3. Thereby, it is ensured that the contact member 15 is in reliable contact the main shaft 3 so as to reliably eliminate the fitting gap between the main shaft 3 and the rotating shaft sleeve 9.

Figure 3:
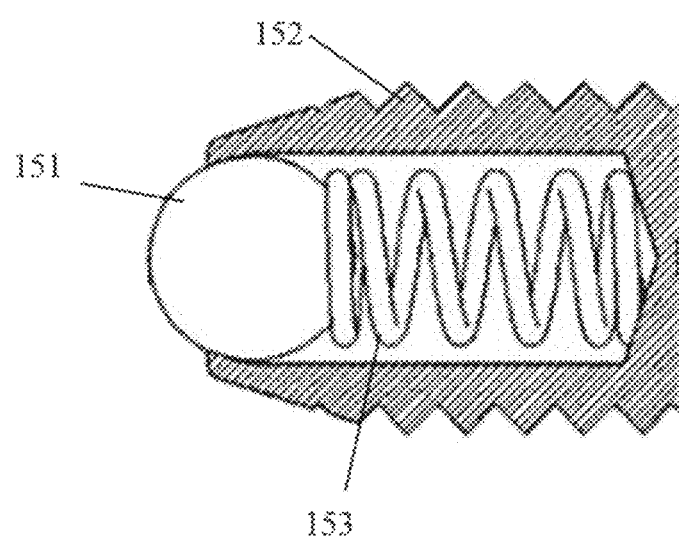
FIG. 3 is a sectional view illustrating an example of a contact member according to the present invention.

FIG. 3 illustrates an example of the contact member 15.

In the example illustrated in FIG. 3, the contact member 15 includes a rolling member 151, a fixing member 152, and an elastic member 153. The rolling member 151 is formed to have a spherical or cylindrical shape. The contact member 15 comes into contact with the main shaft 3 via the rolling member 151, and the contact with the main shaft 3 is rolling contact. One end of the fixing member 152 is provided with a mounting hole, and the other end thereof is fixed to the synchronous rotating pulley 6. The rolling member 151 is held at the top of the mounting hole. The elastic member 153 is installed inside the mounting hole in such a manner that one end is connected to the rolling member 151 and the other end is fixed to the bottom of the mounting hole so as to bias the rolling member 151 toward the main shaft 3 in the radial direction of the main shaft 3.

Thus, by adjusting the elastic member 153, for example, by adjusting the length, the elastic coefficient or the like of the elastic member 153, it is possible to adjust the radial force to be applied by the contact member 15 to the main shaft 3 according to different requirements.

In the example illustrated in FIG. 3, the outer peripheral surface of the fixing member 152 is provided with male screws. Therefore, a threaded hole may be provided in the synchronous rotating pulley 6, and the contact member 15 may be fixed to the synchronous rotating pulley 6 by screwing. Thereby, the contact member 15 may be reliably fixed.

Modified Embodiments

In the above embodiment, the contact member 15 is in contact with one of the two flat surfaces of the main shaft 3. However, the contact member 15 may be brought into contact with one of the two arc surfaces of the main shaft 3 as long as the contact member 15 is in contact with the main shaft 3 so as to apply a radial force to the main shaft 3.

Further, in the above embodiment, the contact member 15 includes the rolling member 151, the fixing member 152, and the elastic member 153. However, the contact member 15 may only include the rolling member 151 and the fixing member 152.

Furthermore, in the above embodiment, the contact member 15 is fixed to the synchronous rotating pulley 6 by screwing. However, the contact member 15 may be fixed to the synchronous rotating pulley 6 by interference fit or the like. Alternatively, the contact member 15 may be sandwiched between the main shaft 3 and the synchronous rotating pulley 6 so that both ends of the contact member 15 may contact the main shaft 3 and the synchronous rotating pulley 6, respectively.

A person skilled in the art may understand that the above-mentioned embodiments are specific examples of the following aspects.

(First Aspect) An autosampler according to one embodiment includes a sampling needle, a swing arm, a main shaft, a synchronous rotating pulley, and a rotating shaft sleeve. One end of the swing arm is fixed to the main shaft, and the other end thereof is fixed with the sampling needle for supplying a sample. The rotating shaft sleeve is installed in the synchronous rotating pulley, and the rotating shaft sleeve is mounted on the main shaft. The main shaft is rotatable around a central axis of the main shaft in synchronization with the rotating shaft sleeve, and movable up and down in the direction of the central axis with respect to the rotating shaft sleeve. The autosampler further includes a contact member. The contact member penetrates the synchronous rotating pulley and the rotating shaft sleeve from one side of the synchronous rotating pulley in the radial direction thereof until it comes into contact with the main shaft, and the contact member is in rolling contact with the main shaft.

According to the autosampler described in the first aspect, since the contact member is in contact with the main shaft, the contact member applies a radial force to the main shaft, which thereby eliminates a fitting gap between the main shaft and the rotating shaft sleeve. Further, since the contact member penetrates the synchronous rotating pulley and the rotating shaft sleeve from one side of the synchronous rotating pulley in the radial direction thereof until it comes into contact with the main shaft, the rotating shaft sleeve may be reliably fixed to the synchronous rotating pulley by the contact member even though the synchronous rotating pulley and the rotating shaft sleeve undergo abrasion or exhaustion. Therefore, the sampling needle fixed at one end of the swing arm does not jitter when being rotated. Accordingly, the sampling needle is located at the same position by the same operation command, which ensures the accuracy and reproducibility of the injection position, making it possible to improve the accuracy and reproducibility of analysis by an instrument such as an atomic absorption spectrophotometer equipped with the autosampler. In addition, since the contact member is in rolling contact with the main shaft, the fitting gap between the main shaft and the rotating shaft sleeve may be eliminated without affecting the up and down motion of the main shaft.

(Second Aspect) In the autosampler according to the first aspect, the contact member includes: a rolling member that comes into rolling contact with the main shaft; a fixing member which has one end provided with a mounting hole and the other end fixed to the synchronous rotating pulley, and the rolling member being held at the top of the mounting hole; and an elastic member which is installed in the mounting hole in such a manner that one end is connected to the rolling member and the other end is fixed to the bottom of the mounting hole so as to bias the rolling member toward the main shaft in the radial direction of the main shaft.

According to the autosampler described in the second aspect, the radial force applied to the main shaft may be adjusted according to different requirements by adjusting the force applied by the elastic member to the main shaft, which ensures the accuracy and reproducibility of the injection position, making it possible to improve the accuracy and reproducibility of analysis by an instrument such as an atomic absorption spectrophotometer equipped with the autosampler.

(Third Aspect) In the autosampler according to the first aspect or the second aspect, the contact member is fixed to the synchronous rotating pulley by screwing. According to the autosampler described in the third aspect, the contact member may be reliably fixed to the synchronous rotating pulley, which ensures the accuracy and reproducibility of the injection position, making it possible to improve the accuracy and reproducibility of analysis by an instrument such as an atomic absorption spectrophotometer equipped with the autosampler.

(Fourth Aspect) In the autosampler according to any one of the first aspect to the third aspect, the peripheral surface of the main shaft includes two flat surfaces facing each other, and the contact member is in contact with one of the two flat surfaces of the main shaft.

According to the autosampler described in the fourth aspect, the contact member may be brought into reliable contact with the main shaft so as to reliably eliminate the fitting gap between the main shaft and the rotating shaft sleeve, which ensures the accuracy and reproducibility of the injection position, making it possible to improve the accuracy and reproducibility of analysis by an instrument such as an atomic absorption spectrophotometer equipped with the autosampler.

Although the embodiments of the present invention have been described above, the embodiments are illustrative only and are not intended to limit the scope of the present invention. The present invention may be modified by a person skilled in the art without departing from the spirit of the present invention.

LIST OF REFERENCE SIGNS

1: sampling needle; 2: swing arm; 3: main shaft; 4: rotating motor; 5: rotating belt; 6: synchronous rotating pulley; 7: rotating position locating plate; 8: rotating position locating sensor; 9: rotating shaft sleeve; 10: lifting motor; 11: lifting belt; 12: lifting position locating plate; 13: lifting position locating sensor; 14: position-locating shaft sleeve; 15: contact member; 151: rolling member; 152: fixing member; 153: elastic member.

What is claimed is:

1. Autosampler comprising:
    a sampling needle;
    a swing arm;
    a main shaft;
    a synchronous rotating pulley; and
    a rotating shaft sleeve,
    one end of the swing arm being fixed to the main shaft, and the other end thereof being fixed with the sampling needle for supplying a sample,
    the rotating shaft sleeve being installed in the synchronous rotating pulley, and the rotating shaft sleeve being mounted on the main shaft,
    the main shaft being rotatable around a central axis of the main shaft in synchronization with the rotating shaft sleeve, and movable up and down in the direction of the central axis with respect to the rotating shaft sleeve,
    characterized in that the autosampler further includes a contact member,
    the contact member penetrates the synchronous rotating pulley and the rotating shaft sleeve from one side of the synchronous rotating pulley in the radial direction thereof until it comes into contact with the main shaft, and
    the contact member is in rolling contact with the main shaft.

2. The autosampler according to claim 1, wherein
the contact member includes:
    a rolling member that comes into rolling contact with the main shaft;
    a fixing member which has one end provided with a mounting hole and the other end fixed to the synchronous rotating pulley, and the rolling member being held at the top of the mounting hole; and
    an elastic member which is installed inside the mounting hole in such a manner that one end is connected to the rolling member and the other end is fixed to the bottom of the mounting hole so as to bias the rolling member toward the main shaft in the radial direction of the main shaft.

3. The autosampler according to claim 1, wherein
the contact member is fixed to the synchronous rotating pulley by screwing.

4. The autosampler according to claim 1, wherein
the peripheral surface of the main shaft includes two flat surfaces facing each other, and
the contact member is in contact with one of the two flat surfaces of the main shaft.

* * * * *